United States Patent

Ikegawa et al.

[11] Patent Number: 5,774,169
[45] Date of Patent: Jun. 30, 1998

[54] IMAGE FORMING APPARATUS

[75] Inventors: Akihito Ikegawa, Sakai; Isao Doi, Toyonaka; Masashi Yamamoto, Settsu; Seishi Ojima, Takatsuki; Keiko Nagayasu, Ibaraki, all of Japan

[73] Assignee: Minolta Co., Ltd., Osaka, Japan

[21] Appl. No.: 623,369

[22] Filed: Mar. 28, 1996

[30] Foreign Application Priority Data

Mar. 29, 1995 [JP] Japan ................................. 7-071235
Jun. 29, 1995 [JP] Japan ................................. 7-163614

[51] Int. Cl.$^6$ .................................................. B41J 2/47
[52] U.S. Cl. ............................................................ 347/262
[58] Field of Search ................................. 347/111, 112, 347/129, 262, 139; 399/168, 174, 176

[56] References Cited

U.S. PATENT DOCUMENTS 4,620,203 10/1986 Nakatami et al. ....................... 347/112
5,216,466 6/1993 Mitani .
5,329,339 7/1994 Sakamoto et al. .................. 347/129 X
5,384,626 1/1995 Kugoh et al. ............................ 399/176
5,418,605 5/1995 Arahira et al. .......................... 399/174

*Primary Examiner*—Edward Tso
*Attorney, Agent, or Firm*—Burns, Doane, Swecker & Mathis, LLP

[57] ABSTRACT

An image forming apparatus having an insulated member disposed adjacent to a photosensitive member, a scanner exposing an image on the photosensitive member in a direction perpendicular to the direction of movement of the insulated member while voltage is applied between the photosensitive member and the insulated member so as to provide a charge on the insulated member surface corresponding to the optical exposure image. The exposure position exposed by the scanner is changed in the direction of movement of the image-bearing member for each scan.

9 Claims, 16 Drawing Sheets

SUB SCANNING DIRECTION

ΔL

|  | $V_{PC}$ [mm/sec] | $\Delta L$ [μm] | RESULT |
|---|---|---|---|
| CO.EXP.1 | 0 ($V_S \times 0$) | 320-2500 | △ |
| EXP.1 | 1.4 ($V_S \times 25$) | 230-1800 | △ |
| EXP.2 | 1.9 ($V_S \times 18$) | 43-75 | ◇ |
| EXP.3 | 7.0 ($V_S \times 5$) | 10-35 | ○ |
| EXP.4 | 35.0 ($V_S$) | -5-28 | ◎ |
| EXP.5 | 70.0 ($V_S \times 2$) | -8-19 | ◎ |
| EXP.6 | 140.0 ($V_S \times 4$) | -45-12 | ○ |
| EXP.7 | 210.0 ($V_S \times 6$) | -170-210 | △ |

*FIG. 11*

|  | $V_{PC}$ [mm/sec] | $\Delta L$ [μm] | RESULT |
|---|---|---|---|
| CO.EXP.2 | 0 ($V_S \times 0$) | 140-370 | △ |
| EXP.8 | 1.4 ($V_S \times 25$) | 65-180 | △ |
| EXP.9 | 1.9 ($V_S \times 18$) | 5-30 | ◎ |
| EXP.10 | 7.0 ($V_S \times 5$) | 0-11 | ◎ |
| EXP.11 | 35.0 ($V_S$) | -5-15 | ◎ |
| EXP.12 | 70.0 ($V_S \times 2$) | -15-12 | ◎ |
| EXP.13 | 140.0 ($V_S \times 4$) | -35-5 | ◎ |
| EXP.14 | 210.0 ($V_S \times 6$) | -115-80 | △ |

*FIG. 12*

| | $\mu \times 10^{-5}$ [cm²/V·sec] | $t \times 10^{-4}$ [cm] | $V_S$ [cm/sec] | $e \times 10^4$ [V/cm] | $P \times 10^{-3}$ | RESULT |
|---|---|---|---|---|---|---|
| EXP.15 | 1.5 | 10 | 3.5 | 16.7 | 1.4 | ○ |
| EXP.16 | 1.5 | 20 | 3.5 | 17.5 | 2.7 | ○ |
| EXP.17 | 1.5 | 30 | 3.5 | 15.2 | 4.6 | △ |
| EXP.18 | 1.4 | 20 | 3.5 | 11.7 | 4.3 | △ |
| EXP.19 | 1.8 | 20 | 3.5 | 23.3 | 1.7 | ○ |
| EXP.20 | 1.5 | 20 | 2.0 | 17.5 | 1.5 | ○ |
| EXP.21 | 800 | 20 | 3.5 | 5.1 | 0.02 | ◎ |
| EXP.22 | 1.5 | 20 | 10.0 | 17.5 | 7.6 | × |
| EXP.23 | 0.13 | 20 | 3.5 | 17.5 | 30.8 | × |
| EXP.24 | 1.5 | 20 | 3.5 | 50.0 | 0.93 | ○ |

FIG. 18

IMAGE FORMING APPARATUS

BACKGROUND OF THE INVENTION

1. Field of the Invention

The present invention relates to an image forming apparatus for forming and recording an electrostatic latent image on a dielectric member, and specifically relates to an image forming apparatus for copying machines, printers, facsimile machines and the like.

2. Description of the Related Art

Image forming apparatuses such as electrophotographic type copying machines and printers and the like use well known image forming methods wherein an electrostatic latent image-carrying member such as a photosensitive member, photosensitive belt or the like is charged by a charging device and the charged region is subjected to optical image exposure so as to form an electrostatic latent image which is then developed by toner so as to be rendered visible, said toner image then being transferred to a transfer member upon which it is then fixed.

In conventional image forming methods of the electrophotographic type, however, a corona discharge is typically used to achieve uniform charging, and such discharge is disadvantageous inasmuch as large amounts of byproducts are generated such as ozone, nitrogen oxides and the like which adversely affect the office environment, and significantly affect the surface of the photosensitive member so as to shorten the service life of the photosensitive member.

There are image forming methods which do not have the aforesaid uniform charging process such as methods used in the devices disclosed in U.S. patent application Ser. No. 2,825,814 and Japanese Examined Patent Application Ser. No. SHO32-8204, wherein an insulated member is disposed adjacent to a photosensitive member and when a voltage is applied therebetween, the photosensitive member is simultaneously subjected to optical image exposure so as to provide a charge distributed on the insulated member surface corresponding to the optical exposure image and thereby form an electrostatic latent image which is then developed by toner, transferred, and fixed (simultaneous voltage application and optical exposure method). In this method, since latent image formation occurs in a construction wherein the photosensitive member and the insulated member are in relatively stationary states, a flat photosensitive member larger than the desired image is required when applied to batch exposure type devices, or a drum type photosensitive member is required when applied to slit scanning exposure type devices, but in either case the photoconductive material used for forming the photosensitive member must cover a large surface area, thereby increasing greatly increasing the cost of the photosensitive member.

From this point of view, devices are known wherein a thin flat photosensitive plate is provided with a charge-holding member arranged opposite thereto, and when a voltage is applied therebetween as the insulated member surface moves, the photosensitive plate is simultaneously subjected to optical exposure to form an electrostatic latent image on the surface of the insulated member (Japanese Unexamined Patent Application Nos. HEI 1-188871 and HEI 1-293358). The devices of the aforesaid disclosures are advantageous inasmuch as they use small amounts of photoconductive material because the photosensitive member plate is flat and small in scale, such that the photosensitive member is therefore inexpensive and the manufacturing process is readily simplified.

When the devices of the aforesaid disclosures are used, however, certain disadvantages arise insofar as stable image formation is difficult. Specifically, a desired image cannot be obtained when image patterns are consecutively exposed in a subscan direction, as shown in FIG. 5, nor when an image extends downstream of a subscan direction, as shown in FIG. 6.

SUMMARY OF THE INVENTION

A main object of the present invention is to provide an image forming apparatus for producing stable images with low ozone generation.

Another object of the present invention is to provide an image forming apparatus capable of producing stable images while utilizing the advantages of the method of relative movement of an insulated member surface relative to a photosensitive member.

Yet another object of the present invention is to provide an image forming apparatus which reduces the elongation of the trailing edge portion of an image.

Still another object of the present invention is to provide an image forming apparatus capable of producing stable images by a compact, low-cost design and with lower ozone generation than conventional methods.

In order to eliminate the previously described disadvantages, the image forming apparatus of the present invention comprises an image-bearing member having an insulation layer disposed over an electrically conductive layer and which is movable, photosensitive member having a photosensitive layer disposed over an electrically conductive layer and arranged so as to confront the insulated layer of the image-bearing member, means for applying a voltage between the conductive layer of the photosensitive member and the conductive layer of the image-bearing member, means for scanning exposure of an image on the photosensitive member in a direction perpendicular to the direction of movement of the image-bearing member while said voltage is applied, means for displacing the exposure position exposed by said exposure means in the direction of movement of the image-bearing member for each scan, and means for developing an electrostatic latent image formed on said image-bearing member.

Another image forming apparatus of the present invention comprises an image-bearing member having an insulation layer disposed over an electrically conductive layer and which is movable, photosensitive member having a photosensitive layer disposed over an electrically conductive layer and arranged so as to confront the insulated layer of the image-bearing member, means for applying a voltage between the conductive layer of the photosensitive member and the conductive layer of the image-bearing member, means for scanning exposure of an image on the photosensitive member in a direction perpendicular to the direction of movement of the image-bearing member while said voltage is applied, means for reciprocating movement of said photosensitive member in the direction of movement of said image-bearing member, and means for developing an electrostatic latent image formed on said image-bearing member.

Still another image forming apparatus of the present invention comprises an image-bearing member having an insulation layer disposed over an electrically conductive layer and which is movable, photosensitive member having a photosensitive layer disposed over an electrically conductive layer and arranged so as to confront the insulated layer of the image-bearing member, means for applying a voltage between the conductive layer of the photosensitive member and the conductive layer of the image-bearing member, means for optical exposure of an image on the photosensitive layer while said voltage is applied, and means for developing an electrostatic latent image formed on said image-bearing member, and wherein the various values of the photosensitive layer construction of said photosensitive member produce the following relationship:

$$1\times10^{-6} \leq t \times Vs/(\mu \times e) \leq 5\times10^{-3}$$

when the moving speed of the photosensitive layer is set at $\mu(cm^2/v \cdot sec)$, the thickness of the photosensitive layer is set at $t(cm)$, the moving speed of the image-bearing member is set at $Vs(cm/sec)$, and the electric field strength across the photosensitive layer is set at $e(v/cm)$.

These and other objects, advantages and features of the present invention will become apparent form the following description thereof taken in conjunction with the accompanying drawings which illustrate specific embodiments of the invention.

BRIEF DESCRIPTION OF THE DRAWINGS

FIG. 11 shows evaluation results for examples 1~7 and reference example 1 using the apparatus of the second embodiment;

FIG. 12 shows evaluation results for examples 8~14 and reference example 2 using the apparatus of the second embodiment;

FIG. 18 shows evaluation results for examples 15~24 using the apparatus of the third embodiment.

DETAILED DESCRIPTION OF THE PREFERRED EMBODIMENTS

When optical image exposure occurs while a voltage is applied between the photosensitive member plate and the image-bearing member, discharge occurs only at the exposure portion by increasing the intensity of the electric field in the air gap between said photosensitive member plate and said image-bearing member. The present invention uses the aforesaid discharge to form an electrostatic, latent image on the image-bearing member.

The previously mentioned phenomenon wherein the trailing edge of an image becomes elongated is believed to occur when there is relative movement between the photosensitive member plate and insulated member surface due to a delay in stopping the discharge arising from a lack of synchronization in terminating the exposure and terminating the discharge.

As a result of detailed investigation into the aforesaid problem of image elongation, the present inventors have discovered a close correlation between the exposure time of the photosensitive member plate and the degree of latent image elongation, and that stable latent image formation without latent image elongation can be realized by avoiding continuous long-term exposure at the same location on the photosensitive member plate, so as to obtain excellent images.

Although the reasons for this situation are not completely clear, it is believed that discharge continues when the electric field is intensified between the photosensitive member plate and the image-bearing member even after optical exposure stops due to:

(1) the accumulation of excess carrier within the photosensitive layer, or (2) thermal release of previously trapped carrier. Accordingly, it is thought that latent image elongation in a subscan direction can be eliminated so as to eliminate "image elongation" of the developed image by reducing the exposure time of the same part of the photosensitive member plate.

A first embodiment of the present invention is described hereinafter with reference to the accompanying drawings.

The apparatus of the first embodiment sequentially exposes a plurality of positions on the photosensitive member plate so as to avoid continuous long-term exposure of the same part of the photosensitive member plate.

Figure 1:
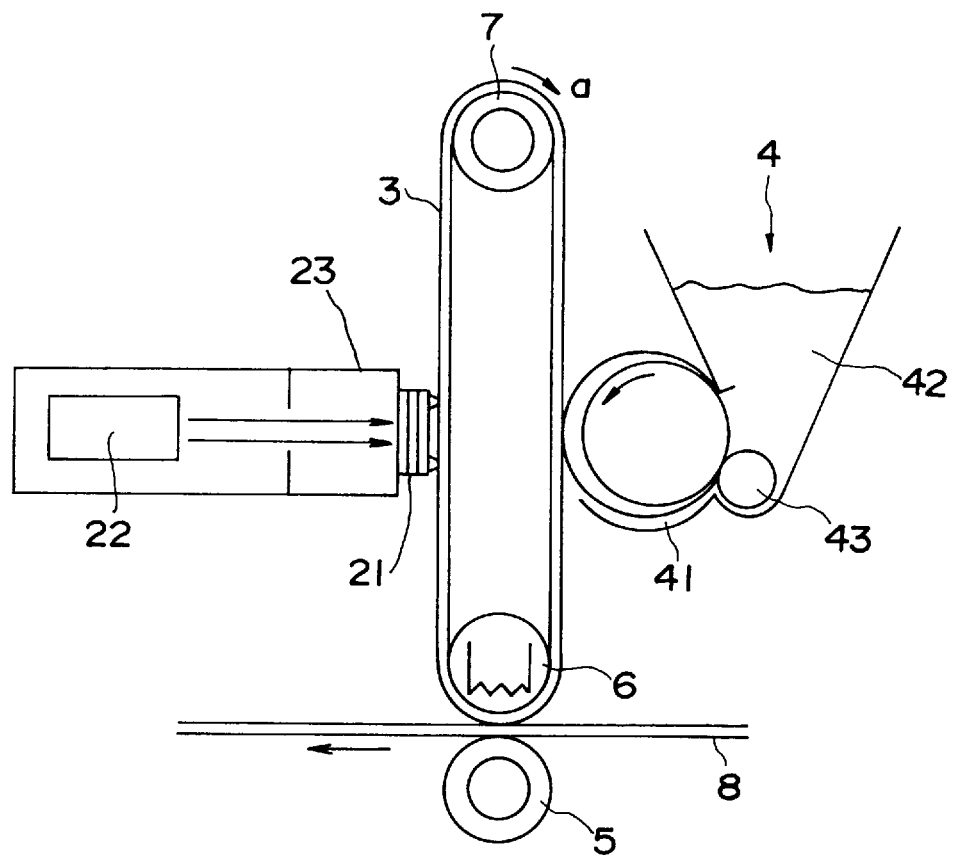
FIG. 1 briefly shows an electrostatic latent image forming apparatus of a first embodiment of the present invention.
Figure 2:
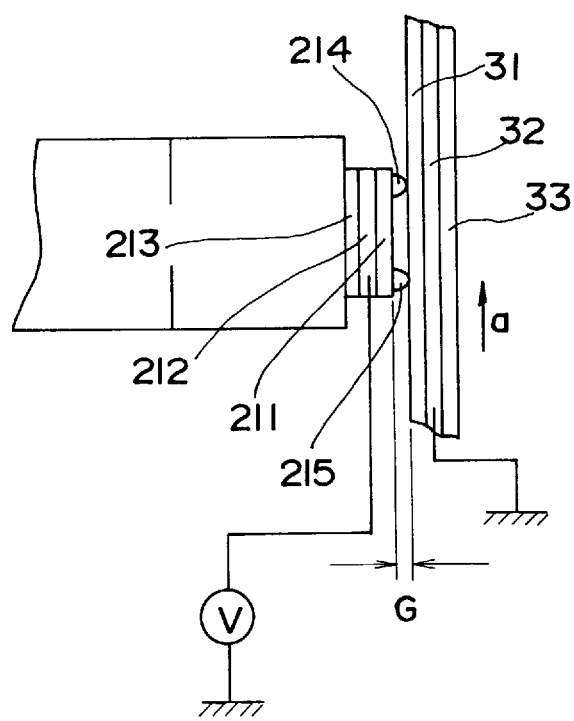
FIG. 2 illustrates the writing head of FIG. 1.

FIG. 1 is a brief section view showing the image forming method of the present invention. FIG. 2 is an enlargement of the. latent image forming portion.

In FIG. 1 image-bearing belt 3 is rotated in the arrow a direction by drive rollers 6 and 7 which are rotated by a drive device not shown in the drawing. Arranged sequentially around the periphery of image-bearing member 3 in the direction of rotation of said member 3 are electrostatic latent image forming device 2, developing device 4, and transfer roller 5.

As shown in FIG. 2, image-bearing member belt 3 comprises a dielectric member 33 which is backed by a conductive layer 32 provided with a thin dielectric layer 31, said surface being arranged so as to confront the latent image forming device 2.

Latent image forming device 2 is provided with a photosensitive member plate 21 which confronts the image-bearing member belt 3, and an optical unit 22 which emits a leaser beam.to irradiate photosensitive member plate 21.

As shown in FIG. 2, photosensitive member plate 21 comprises a transparent conductive layer 212 superimposed on a rectangular transparent substrate 213 which has length in the width direction of image-bearing member belt 3, and a photosensitive layer 211 provided on said transparent conductive layer 212. Fluororesin spacers 214 and 215 are provided at bilateral ends of photosensitive layer 211, so as to form an air gap G between the photosensitive layer 211 of photosensitive plate 21 and the dielectric layer 31 of image-bearing member belt 3. Conductive layer 32 of image-bearing member belt 3 is grounded, and a predetermined direct current (DC) voltage is applied to transparent conductive layer 212.

Since the photosensitive member plate is in a state of non-contact with the image-bearing member, the surface of the photosensitive plate does not become soiled by the transport of foreign matter, thereby allowing stable latent image formation. The material of spacers 214 and 215 are not specifically limited to fluororesins, and other materials may be used insofar as such materials have a small friction coefficient relative to image-bearing member belt 3, and are not easily damaged.

Figure 3:
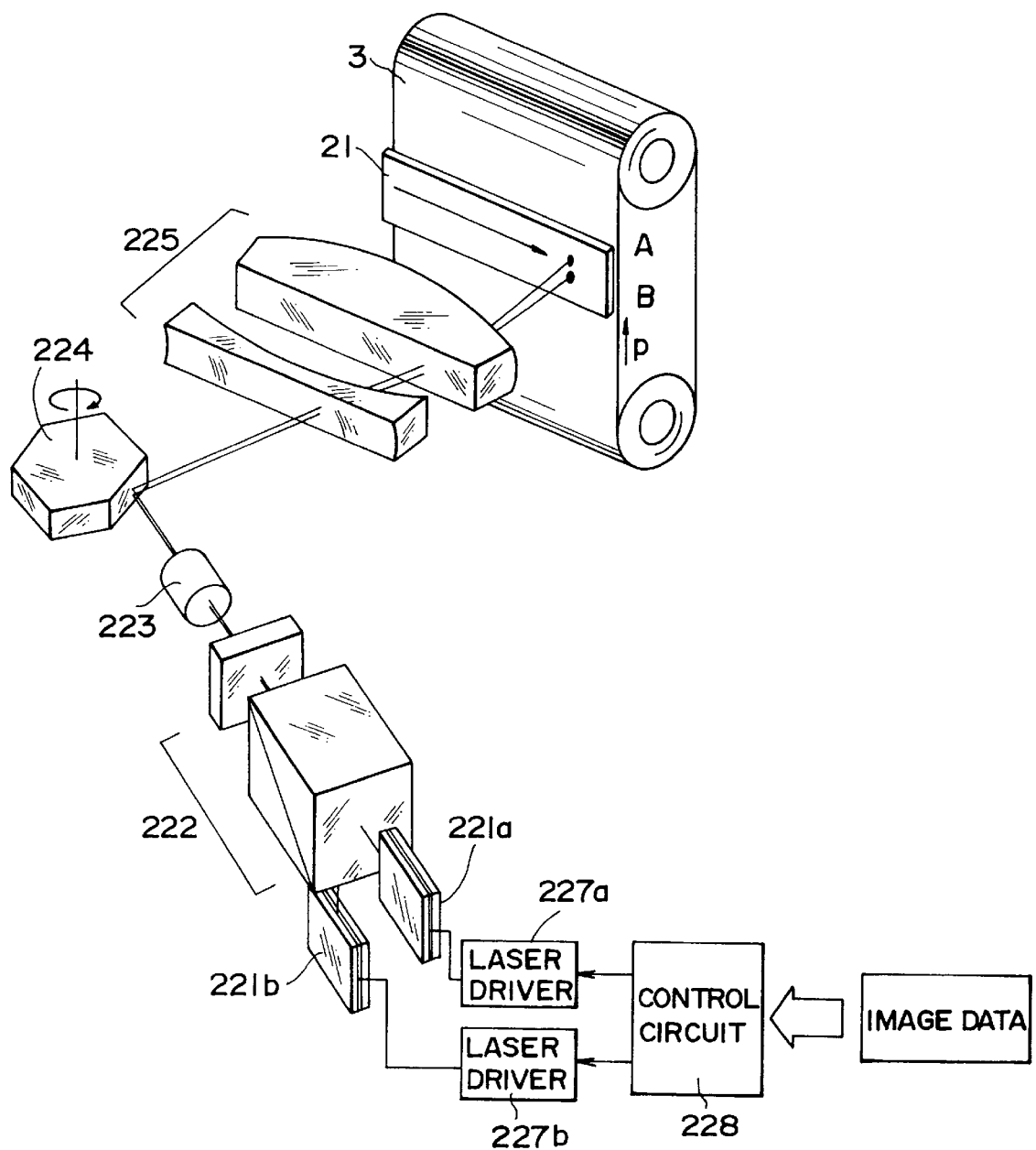
FIG. 3 shows the scanning optical system of the electrostatic latent image forming apparatus of the first embodiment.

As shown in FIG. 3, optical unit 22 comprises two semiconductor lasers 221a and 221b, beam splitter 222, collimator lens 223, polygonal mirror 224, and fø lens 225 sequentially arranged within a housing, and emits a laser beam to scan photosensitive member plate 21 in a direction (hereinafter referred to as "subscan direction") perpendicular to the direction of movement of image-bearing member belt 3. Specifically, laser light emitted from semiconductor lasers 221a and 221b irradiate in parallel at a predetermined distance L. An exposure slit 226 is formed between photosensitive member plate 21 and optical unit 22, such that the scanning laser light passes therethrough t expose the surface of photosensitive member plate 21.

Semiconductor lasers 221a and 221b are respectively connected to laser drive circuits 227a and 227b. Control circuit 228 turns ON/OFF lasers 221a and 221b based on image data.

The principles of electrostatic latent image formation by the aforesaid construction are described below.

As previously mentioned, the conductive layer 32 of image-bearing member belt 3 is grounded, and a predetermined DC voltage is applied to transparent conductive layer 212. When image exposure is accomplished by optical unit 2, the exposed portion of photosensitive layer 211 becomes conductive, such that the intensity of the electric field is intensified in the exposed portion between conductive layer 212 of photosensitive plate 21 and conductive layer 32 of image-bearing member belt 3. only the exposed portion is discharged via the increased intensity of the electric field, and a positive polarity electrostatic latent image is formed on image-bearing member belt 3 via said discharge.

The latent image formed on dielectric belt 3 by the aforesaid process is transported to the developing portion by the rotation of drive rollers 6 and 7, and is developed as a toner image by developing device 4. Thereafter, the toner image is heated by a heating member provided within drive roller 6, and simultaneously transferred to transfer sheet 8 by transfer roller 5 and fixed thereon. At this time the toner image is completely transferred to transfer sheet 8.

The image writing sequence of the aforesaid apparatus is described in detail below with reference to FIGS. 3 and 4.

As shown in FIG. 3, the laser beams generated by semiconductor lasers 221a and 221b are emitted in the same direction by beam spiitter 222, and after passing through collimator lens 223, are deflected by the rotating polygonal mirror 224 and enter fø lens 225, and form images on plate-like photosensitive member plate 21 as two spots scanning in parallel to the arrow m direction along the main scan direction.

The scan spot produced by the laser beam emitted from semiconductor laser 221a is designated scan spot A, and the scan spot produced by the laser beam emitted from semiconductor laser 221b is designated scan spot B. When image data are transmitted to print control section 228, the laser drive circuits 221a and 221b are alternatingly driven in print control section 228 to drive the respective semiconductor lasers for each scan, and produce light beams corresponding to the image data.

Figure 4:
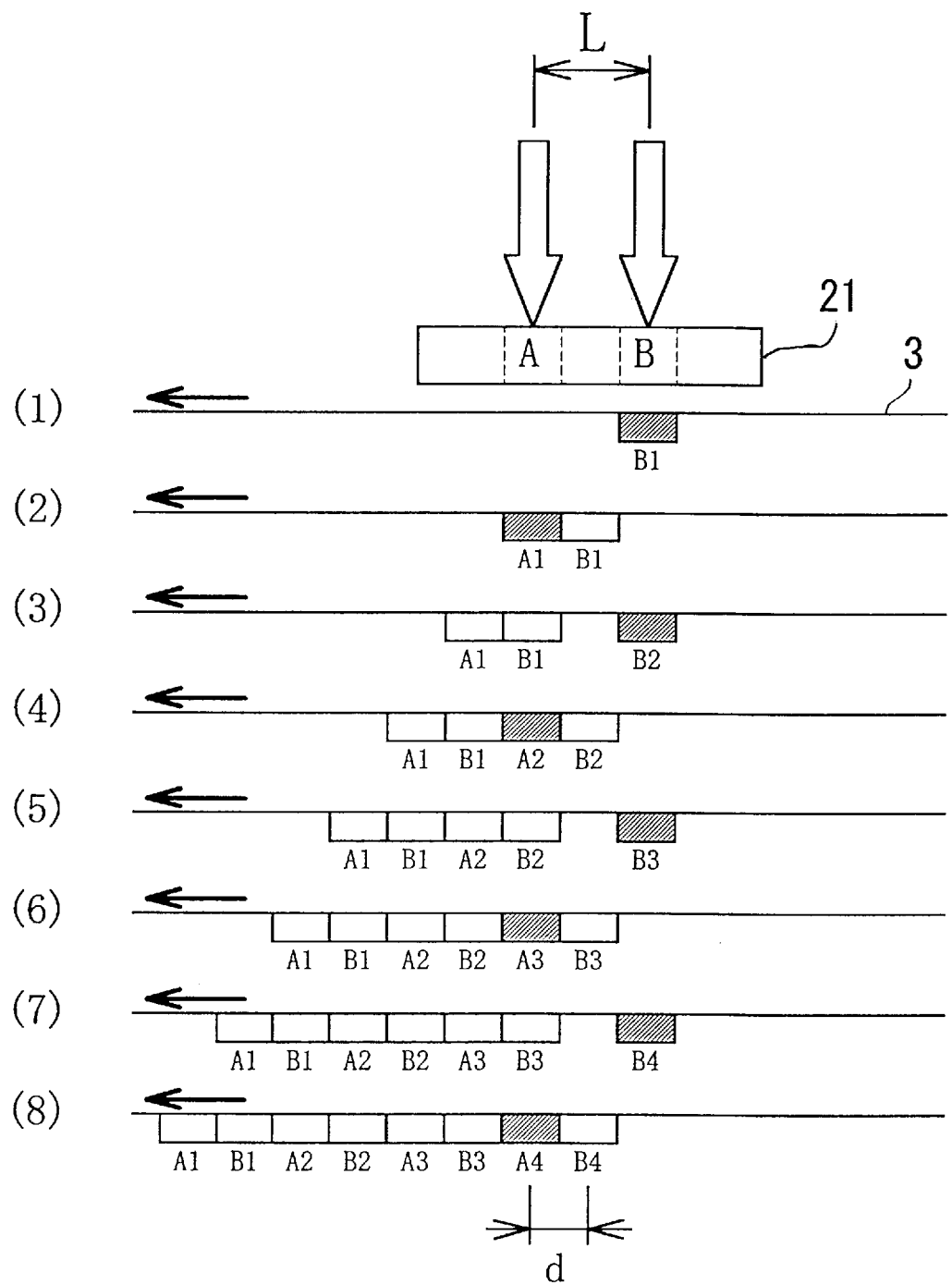
FIG. 4 shows the steps of the latent image forming process of the first embodiment.

FIG. 4 shows the condition of the electrostatic latent image formation during image printing in the mode of the present invention.

The beam emitted from semiconductor laser 221a scans region A of photosensitive member plate 21, and the beam emitted from semiconductor laser 221b scans region B of photosensitive member plate 21, as shown in FIG. 4. The distance L between the center lines of region A and region B in the subscan direction is set at twice the distance of the distance d between center lines of adjacent pixels. In examples described later, since the pixel center line distance d was 85 $\mu$m $\mu$at a pixel density of 300 dpi, the distance L was set at 170 $\mu$m.

The image-bearing member belt 3 advances in the arrow direction in the drawing, such that an electrostatic latent image is formed in accordance with image data at the portion exposed to exposure light along the portion sequentially confronting photosensitive plate. Reference numbers (1) through (8) illustrate the steps of writing when advancing one pixel at a time; the shaded region in the drawing refer to area exposed to image exposure light in that step.

When printing an image, semiconductor laser 221b is driven to expose region B, and form an electrostatic latent image corresponding to said exposure light on region B1 on image-bearing member belt 3 (1). Then, image-bearing member belt 3 advances in the arrow direction in the drawing, and semiconductor laser 221a is driven with a timing which specifies region A1 is directly under region A of photosensitive member plate 21, and a latent image is formed at region A1 on the image-bearing member belt 3 exposed to the light of region A (2). Then, semiconductor laser 221b is driven to expose region B, and a latent image corresponding to the exposure light is formed at region B1 on image-bearing member belt 3 (3). Thereafter, latent images are similarly sequentially formed at regions B1, A1, B2, A2, B3, A3, B4, A4, . . . . by alternating the exposure of region B and region A.

The exposure conditions are 120 $\mu$w/dot at 300 dpi.

Developing device 4 is a monocomponent contact type developing device using a developer comprised of toner alone. In developing device 4, the toner used is a negative charge type toner having an average particle size of 10 $\mu$m obtained by kneading, pulverizing, and classifying a mixture of mainly bisphenol A type polyester resin and carbon black by a well-known method. This toner is accommodated in developing device 4, and accomplishes development by means of a developing bias. Toner 42 accommodated in the toner hopper of developing device 4 is supplied to developing sleeve 41 via supply roller 43, so as to produce a thin toner layer on said sleeve at the same time said toner is triboelectrically charged to a predetermine charge by a layer forming blade. Developing sleeve 41 is a nickel-plated thin cylindrical sleeve supported and drive by a drive roller so as to transport a thin layer of charged toner such that said toner layer makes contact with image-bearing member belt 3 bearing a latent image thereon, and the toner is adhered to the latent image by the charge distribution of said latent image, thereby developing a toner image.

Image-bearing member belt 3 is provided with a conductive layer on a polyimide film 50 $\mu$m thick, 25 cm wide, and 30 cm long, over which is provided a fluororesin layer several micrometers in thickness. The construction and configuration of the image-bearing member is not limited to a belt-like configuration and may be a drum-like shape.

Photosensitive member plate 21 is a function-separated type organic photosensitive member comprising an ITO layer formed on a glass substrate (1 mm thick, 25 cm wide, 2.5 cm long).

The charge-generating layer is formed using a mixture of bisazo pigment and polyvinylbutyral resin about 4 $\mu$m in thickness. Then a charge-transporting layer is formed using a mixture hydrazone compound and polycarbonate as the main components and 20 $\mu$m in thickness. At this time, the migration speed $\mu$ is about $1.5 \times 10^{-5}$ (cm$^2$/v·sec) determined by the well-known "time of flight" method.

The thickness of the dielectric layer 32 was set at 10 $\mu$m, and the gap between the photosensitive member and the dielectric member was set at 20 $\mu$m. the voltage applied between the conductive layer 32 of image-bearing member 3 and the transparent conductive layer 212 of photosensitive plate 21 was fixed at 1.5 kV, and the system speed was fixed at 3.5 cm/sec.

Figure 5:
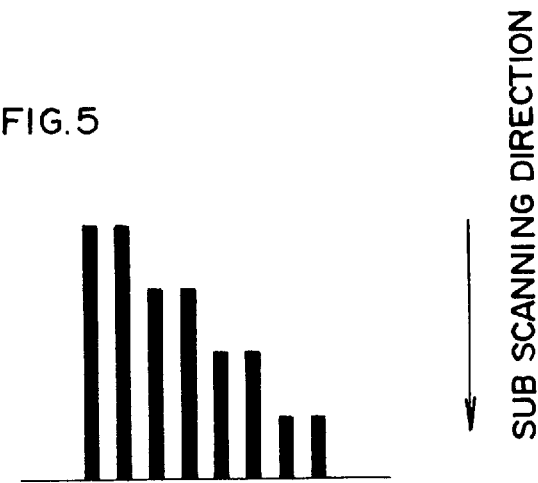
FIG. 5 shows a desirable image used for testing.

When a test pattern image comprising vertical lines 10–40 mm in length, 2.54 mm in width (30 dots) was printed, as shown in FIG. 5, excellent quality images were obtained without image elongation.

The distance L in the subscan direction between scan exposure portion A of semiconductor laser 221a and scan exposure portion B of semiconductor laser 221b is not limited to twice the inter-pixel distance d, and may be any even multiple such as 4 times, or 6 times. For example, when the image data used for image formation is A1, B1, A2, B2, A3, B3, A4, B4, A5, B5, . . . , and distance L=4×d, semiconductor lasers 221a and 221b are sequentially driven in the order B1, rest, B2, A1, B3, A2, B4, A3, B5, A4, . . . , to accomplish image exposure and obtain a desired image.

When distance L=6×d, semiconductor lasers 221a and 221b are driven in the order B1, rest, B2, rest, B3, A1, B4, A2, B5, A3, B6, . . . , to accomplish image exposure and obtain a desired image.

Figure 8:
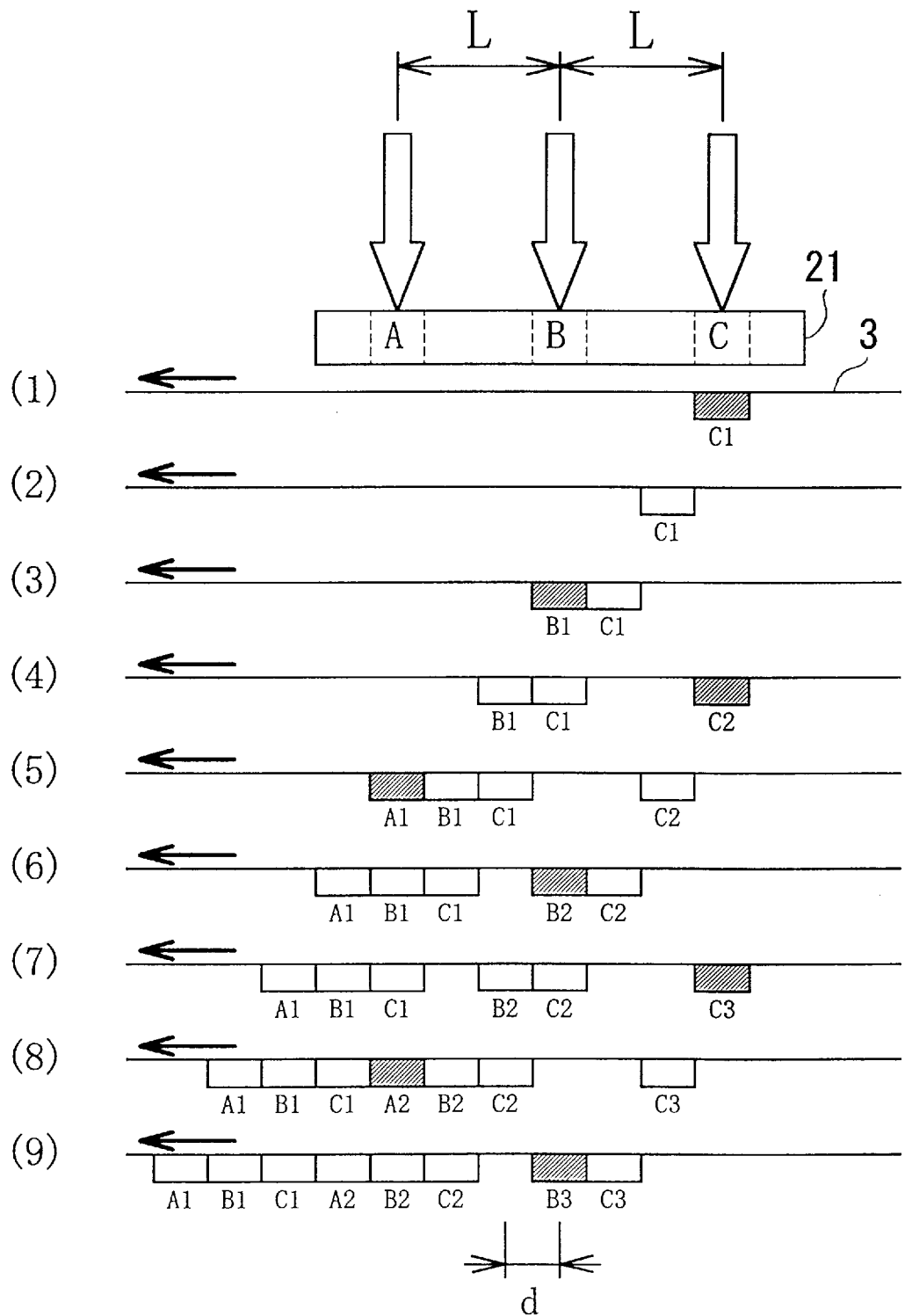
FIG. 8 shows the steps of still another latent image forming process of the first embodiment.

Furthermore, when a 3-beam optical unit is used for sequential exposure, the scan exposure areas of the photosensitive plate are designated region A, region B, and region C, as shown in FIG. 8. In this case the device sets the distance L such that L=3×d, and the image data for image formation is A1, B1, C1, A2, B2, C2, A3, B3, C3, A4, B4, C4, A5, B5, C5, . . . , and the lasers are driven in the order C1, B1, C2, A1, B2, C3, A2, B3, C4, A3, B4, C5, . . . to accomplish image exposure.

Although in the above constructions, the scan region on the photosensitive member plate are exposed by light emitted different semiconductor lasers, the various scan regions may be scanned using a single semiconductor laser by changing the direction of the exposure beams.

For example, when a single semiconductor laser is used, the angle of the reflective surface of a polygonal mirror having an even number of reflective surfaces may be shifted from a perpendicular plane by a predetermined angle, such that the beam scans a different desired position for each line.

Furthermore, when a single semiconductor laser is used, a light deflecting element may be arranged between the semiconductor laser and the polygonal mirror to deflect the beam so as to scan a different predetermined position for each line. The aforesaid light deflecting element may be, for example, a reflecting mirror reciprocally oscillated at a predetermined frequency, or an acousto-optic element for deflecting a light beam at a predetermined angle in accordance with the frequency of a drive signal using an acousto-optic effect.

A single semiconductor laser element may be used to produce a plurality of laser beams from independently driven photoemitting portions, such that said plurality of beams scan various predetermined scan position on the photosensitive plate.

Although a scanning type optical unit is used in the above embodiment, the present invention may be realized using solid state optical scanning units such as an LED array head, liquid crystal shutter array, PLZ shutter array and the like, such that even when writing an image using a plurality of rows of solid state scanning heads, a plurality of regions can be alternately or simultaneously scanned using deflector elements.

The media for writing a latent image is not limited to a belt-like dielectric member, inasmuch as the present invention may be realized using a drumshaped, or sheet-like member.

As previously described, in the first embodiment of the present invention, a desired latent image can be formed without image elongation because the same position on photosensitive member plate 21 is not continuously subjected to exposure. Therefore, stable images are obtained without the problem of image elongation.

In image forming apparatuses and the like using the electrostatic latent image forming device of the present invention, conventional large cylindrical photosensitive members need not be used, and latent image formation can be accomplished without excess discharge, thereby realizing a compact construction and low ozone generation.

In the image forming apparatus of the first embodiment, a cleaner is unnecessary because a simultaneous thermal transfer and fixing method is used at the transfer portion to develop a toner image directly on the dielectric member, thus allowing a compact and low-cost construction, and low ozone generation.

A second embodiment of the present invention is described hereinafter with reference to the accompanying drawings.

The apparatus of the second embodiment provides that a photosensitive member plate 142 is reciprocally movable in a subscan direction to prevent long-term continuous exposure of the same region of the photosensitive plate.

Figure 9:
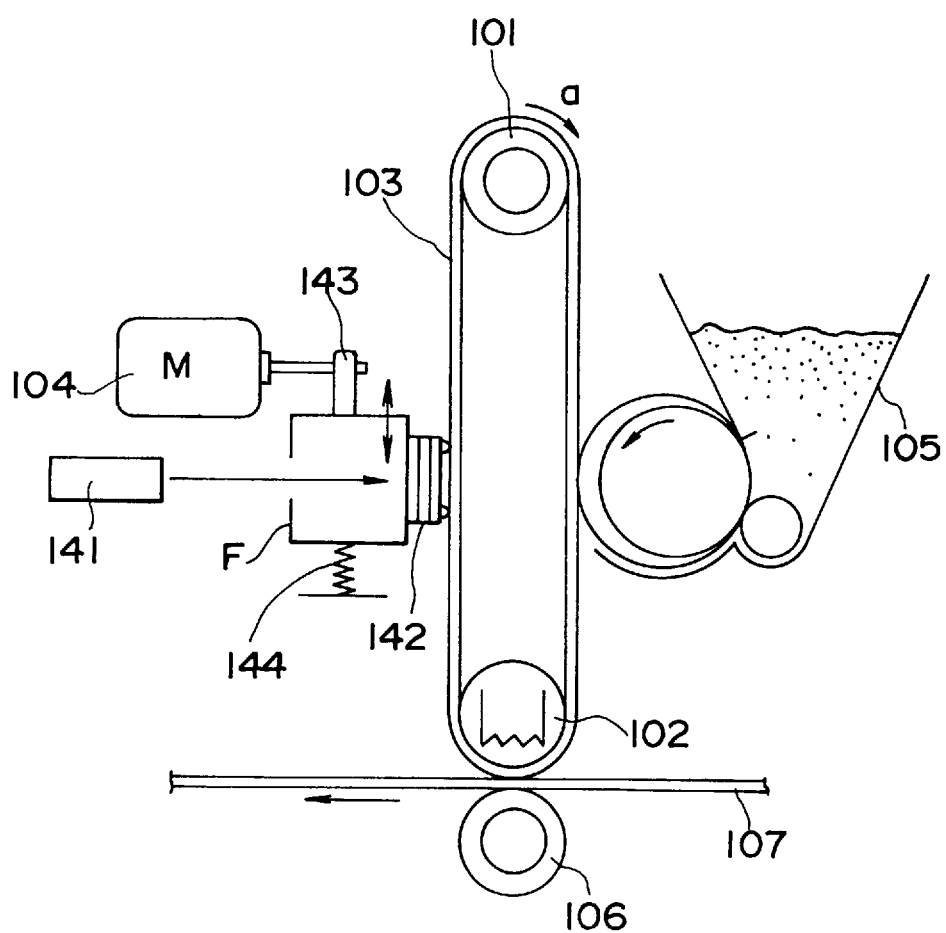
FIG. 9 shows an image forming apparatus of a second embodiment of the present invention.
Figure 10:
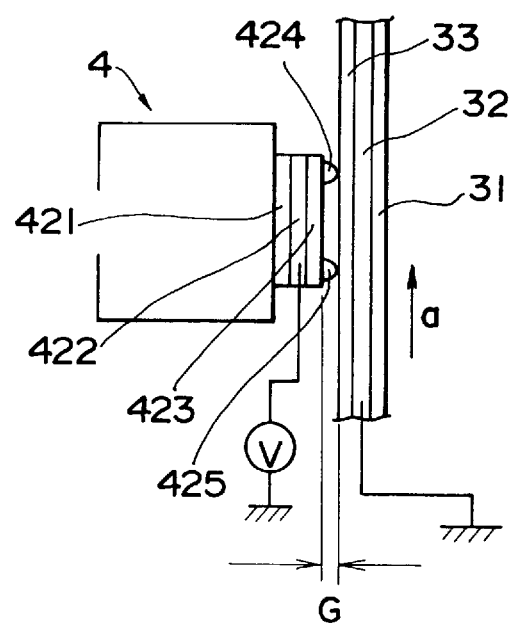
FIG. 10 shows the essential portion of the second embodiment.

FIG. 9 briefly shows the construction of an image forming apparatus of the present invention. FIG. 10 shows the essential portions of image forming apparatus 100.

Image forming apparatus 100 is provided with an image-bearing member belt 103 looped around a drive roller 101 which is rotatable in the arrow a direction and a heating roller 102 provided parallel to said drive roller. Arranged sequentially around the periphery of image-bearing member belt 103 are latent image forming device 104, developing device 105, and transfer roller 106.

Image-bearing member belt 103 comprises a dielectric member 131 over which is formed a conductive layer 132, and over said conductive layer is formed a thin dielectric layer 133. Conductive layer 132 is grounded by a conductive line. Dielectric layer 133 is formed on the exterior surface of the belt. The specific construction of the image-bearing member in the present embodiment includes a conductive layer on a polyimide film 50 $\mu$m thick, 250 mm wide, and 300 mm in circumference, and a fluororesin layer of several micrometers in thickness. The configuration of the image-bearing member is not limited to a belt-shape, and may be a drum-shape.

Latent image forming device 104 is provided with an optical unit 141 and a photosensitive plate 142. Optical unit 141 comprises, within a housing, a laser generating device, polygonal mirror, toroidal lens, half-mirror, spherical mirror, folding mirror, and reflecting mirror, and laser light emitted from a semiconductor laser generating device scans photosensitive plate 142. The direction of scanning exposure of the laser light is the width direction of image-bearing member belt 103, and is hereinafter referred to as the main scan direction, whereas a direction perpendicular to said main scan direction (vertical direction in FIG. 9) is hereinafter referred to as the subscan direction. An exposure slit 400 is formed in the housing of optical unit 141 to allow laser light to irradiate photosensitive member plate 142. The construction of optical unit 141 is not limited t the above construction, and may include, for example, an arrangement of an LED array in the main scan direction, or an arrangement of a liquid crystal shutter array, PLZT photoshutter array in the main scan direction. When a liquid crystal shutter array or PLZT photoshutter arrays is used, a halogen lamp may be provided as a light source, such that light from said light source selectively illuminates photosensitive late 142 via the optical shutter array.

On the other hand, as shown in FIG. 10, photosensitive plate 142 comprises a transparent conductive layer 422 formed over a rectangular panel-shaped transparent substrate 421 in the main scan direction, and a photosensitive layer 423 formed over said transparent conductive layer 422. A positive voltage of about 1.5 kV is applied to transparent conductive layer 421 Accordingly, an electric field is formed by the 1.5 kV voltage differential between transparent conductive layer 421 and grounded conductive layer 132. A gap G is formed between the photosensitive layer 423 of photosensitive plate 142 and dielectric layer 133 of image-bearing belt 103 via spacers 424 and 425 which are coated with a fluororesin. Since the photosensitive layer 425 and dielectric layer 133 are maintained in a state of non-contact via spacers 424 and 425, the surface of photosensitive layer 425 is not soiled even when foreign matter is transported between photosensitive layer 425 and dielectric layer 133, thereby allowing stable latent image formation. The coating material of spacers 424 and 425 is not limited to fluororesins, and other materials may be used insofar as such materials have a small friction coefficient relative to image-bearing member belt 103, and are not easily damaged. The configuration of photosensitive member plate 142 is not limited to a panel-like shape and other configurations may be used.

Photosensitive plate 142 is mounted on a transparent frame F having a squared U-shaped cross section. A cam 143 is provided at the top of transparent frame F, and a spring 144 is provided at the bottom of frame F. Cam 143 is connected to motor M; photosensitive plate 142 is reciprocally driven in the subscan direction via the rotation of motor M by a drive source (not illustrated). The period and amplitude of the reciprocation of photosensitive plate 142 can be changed by changing a suitably selected shape of cam 123 and the number of rotations of motor M. The method of driving photosensitive member plate 142 is not limited to the aforesaid mechanism, and such mechanism is not specifically restricted so long as the method allows stable reciprocating movement of photosensitive member plate 142.

When exposure is accomplished by optical unit 141 in accordance with image signals while photosensitive plate 142 moves reciprocatingly in the subscan direction, an electrostatic latent image is formed on dielectric belt 103. The principle by which the electrostatic latent image is formed is identical to the principle of the first embodiment. The electrostatic latent image formed on image-bearing member 103 is transported to developing device 105 via the rotation of drive roller 101 and heating roller 102, to be developed as a toner image. Developing device 105 of the present embodiment is a monocomponent contact-type developing device, and accomplishes positive development. The toner used is a negative charge type toner having an average particle size of 10 $\mu$m obtained by kneading, pulverizing, and classifying a mixture of mainly bisphenol A type polyester resin and carbon black by a well-known method. This toner is accommodated in developing device 5, and accomplishes development by means of a developing bias.

This toner image is transported in conjunction with the rotation of drive roller 101 and heating roller 102, and when heated by heating a member provided within heating roller 102 is simultaneously transferred to transfer sheet 107 by transfer roller 106. At this time, the toner image is completely transferred to transfer sheet 107.

Examples using the device of the second embodiment are described below. In the following examples, the average speed vpc (mm/sec) of photosensitive plate 142 is defined below.

Vpc=2 w/tp where W is the width (mm) of reciprocating movement of photosensitive plate 142, and tp is the period (sec) of reciprocating movement of photosensitive plate 142.

EXAMPLES 1~7, AND REFERENCE EXAMPLE 1

Photosensitive member plate 142 is a function-separated type organic photosensitive member comprising an ITO layer formed on a glass substrate (1 mm thick, 25 cm in main scan direction, 2.5 cm in subscan direction).

The charge-generating layer was formed using a mixture of bisazo pigment and polyvinylbutyral resin about 4 $\mu$m in thickness. Then a charge-transporting layer was formed using a mixture hydrazone compound and polycarbonate as the main components and 20 $\mu$m in thickness.

The thickness of the dielectric layer 133 was set at 10 $\mu$m, and the gap G between the photosensitive member and the dielectric member was set at 20 $\mu$m. The voltage applied between the conductive layer and the photosensitive plate was set at 1.5 kV, and the system speed (moving speed of image-bearing belt 103) was fixed at 3.5 cm/sec. The amplitude of reciprocating movement of photosensitive plate 142 was set at about 0.5 cm.

In examples 1~7, image evaluation was conducted when the average speed vpc of the reciprocating movement of photosensitive plate 142 was varied within a range of ½5 times to 6 times the system speed vs. In reference example 1, image evaluation was conducted when photosensitive plate 142 did not move reciprocating in the image forming apparatus of the previously described conditions (pc=vs ×0) Examples 8~14, and Reference Example 2

Photosensitive member plate 142 comprised an amorphous silicon photosensitive material vacuum deposited on an ITO layer glass substrate. A 0.2 $\mu$m P-type amorphous silicon layer was formed as an undercoat layer, a 20 $\mu$m amorphous silicon layer was formed as a photosensitive layer, and thereafter, a 0.2 $\mu$m carbon-rich amorphous silicon layer was formed as an overcoat layer.

The thickness of the dielectric layer 133 was 10 $\mu$m, and the system speed was set at 3.5 cm/sec. At this time, a gap of 20 $\mu$m was set between the photosensitive plate 142 and the dielectric member 103, and a voltage of 1.5 kV was applied between photosensitive plate 142 and dielectric member 103.

In examples 8~14, image evaluation was conducted when the average speed vpc of the reciprocating movement of photosensitive plate 142 was varied within a range of ½s times to 6 times the system speed vs. In reference example 2, image evaluation was conducted when photosensitive plate 142 did not move reciprocating in the image forming apparatus of the previously described conditions (pc=vs×0).

Figure 6:
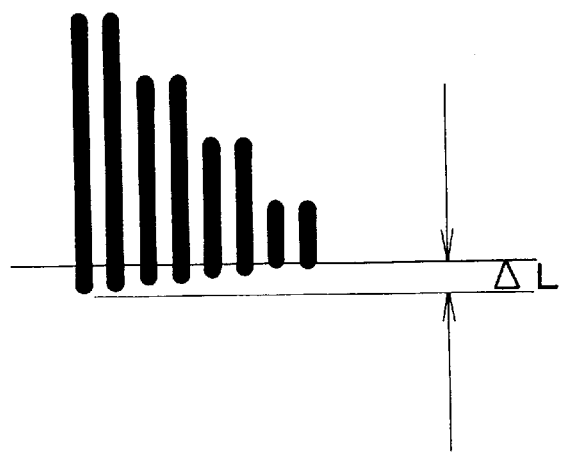
FIG. 6 illustrates circumstances when the image of FIG. 5 is formed using conventional art.
Figure 7:
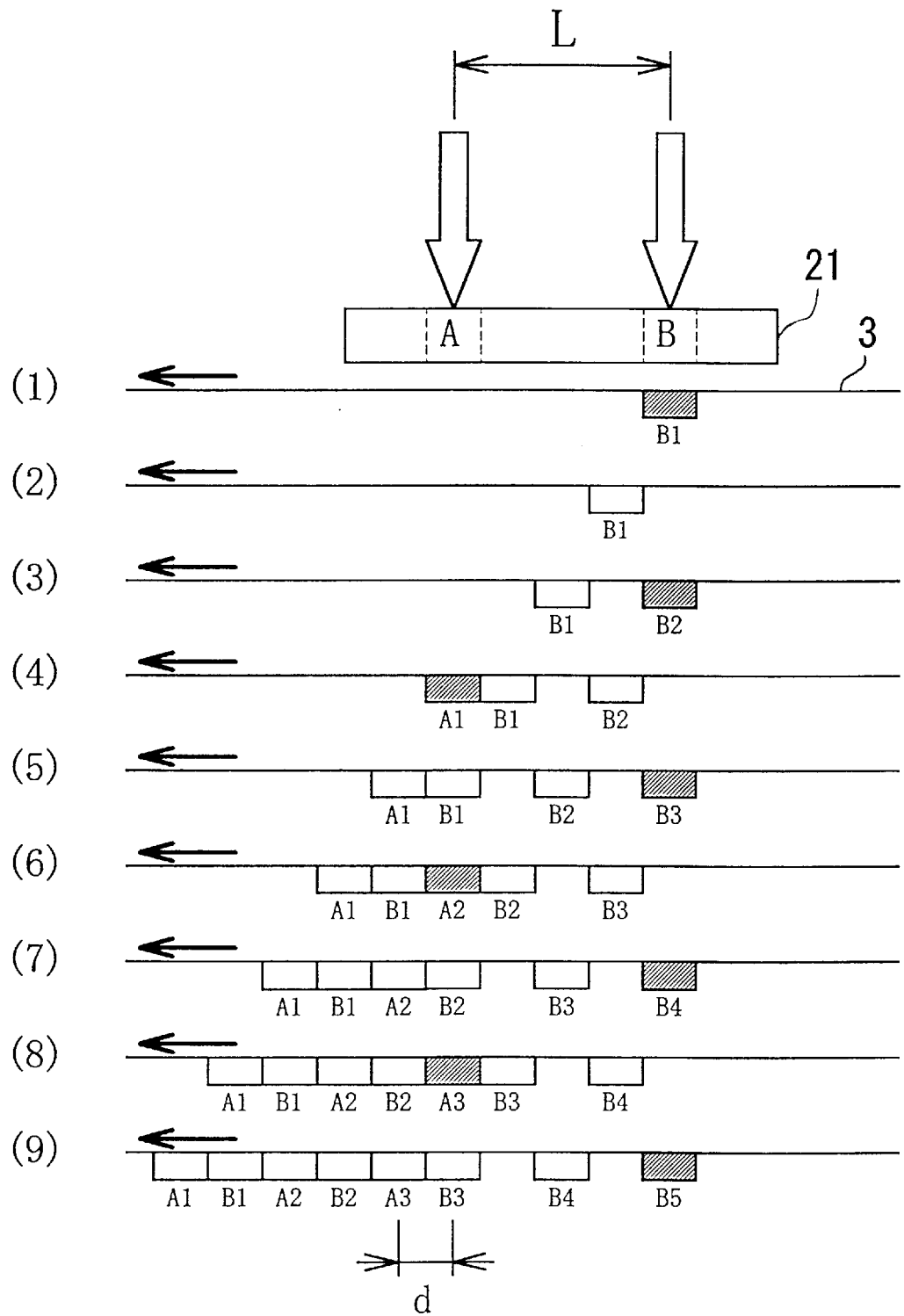
FIG. 7 shows the steps of another latent image forming process of the first embodiment.

The exposure conditions were set at 120 μW/dot at 300 dpi in the latent image forming conditions of examples 1~14 and reference examples 1 and 2. The image data pattern used in the evaluations comprised vertical lines 10~40 mm in length in the subscan direction and 30 dots wide, as shown in FIG. 5. This pattern was exposed by laser light, and the elongation AL of the line length of the toner image actually reproduced n a recording sheet was evaluated as follows (refer to FIG. 6).

⊙: Excellent within a range of ±30 μm

○: Exceptionally good within a range of ±50 μm

◇: Good within a range of ±100 μm

Δ: variation range greater than 100 μm

Evaluation results are shown in FIGS. 11 and 12. When an organic photosensitive material was used for photosensitive member plate 142, and when amorphous silicon photosensitive material was used, images of greater stability were obtained when photosensitive member plate 142 was exposed in a state of reciprocating movement rather than exposed in a stationary state. Particularly stable images were obtained when the relationship between the average speed vpc of reciprocating movement of photosensitive plate 142 and the system speed vs was as follows.

$$|vs|/20<|vpc|<5\times|vs|$$

According to the second embodiment described above, exposure is accomplished via a light source while the photosensitive plate moves reciprocatingly in a different direction from the direction of exposure via the exposure device by means of a reciprocating movement means. Accordingly, a mechanism for rotatably driving the photosensitive member is unnecessary, thereby simplifying the construction of the apparatus.

A third embodiment of the present invention is described below.

Although the first and second embodiment have been described in terms of the phenomenon of elongation of the trailing edge of an image, and are further constructed so as to prevent continuous exposure of the same region of a photosensitive plate which produces the phenomenon of latent image drift in the direction of movement of the image-bearing member, the apparatus of the third embodiment deals with the problem by regulating the characteristics of the photosensitive member. As a result of various investigations into the aforesaid problem, the present inventors have discovered image drift can be prevented and uniform images obtained by maintaining a mutual relationship between the moving time of the dielectric member and the time required for the charge moving within the photosensitive layer to reach the vicinity of the surface of the photosensitive layer.

Therefore, the image forming apparatus of the third embodiment sets the various values of the moving speed of the photosensitive layer of the photosensitive plate, thickness of the photosensitive layer, moving speed of the image-bearing member, and field intensity e across the photosensitive layer at predetermined interdependent relationships. In the image forming apparatus of the present invention, particularly effective results are obtained by setting the aforesaid parameters to maintain a mutual relationship between the moving time of the dielectric member and the time required for the charge moving within the photosensitive layer to reach the vicinity of the surface of the photosensitive layer, i.e., migration speed $\mu$ ($cm^2$/v·sec) of the photosensitive member set at $1\times10^{-6}$ to $1\times10^{-2}$, thickness t (cm) of the photosensitive layer set at $5\times10^{-4}$ to $5\times10^{-3}$, moving speed Vs (cm/sec) of the image-bearing member set at 1 to 20, and field intensity 3 (v/cm) across the photosensitive layer set at 1 to 50.

Figure 13:
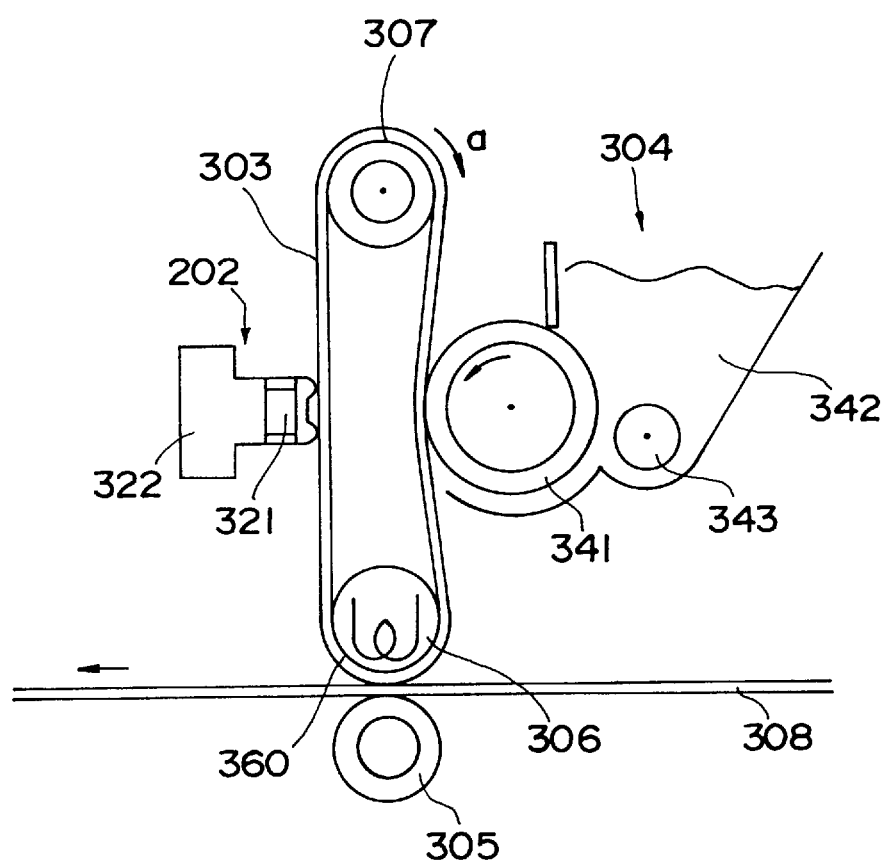
FIG. 13 briefly shows the image forming apparatus of a third embodiment of the present invention.

FIG. 13 is a conceptual drawing of the image forming apparatus of the third embodiment of the invention.

In FIG. 13, reference number 303 refers to an image-bearing member belt corresponding to the image-bearing member of the present invention, and is rotatably driven in the arrow a direction at 3.5 cm/sec via drive rollers 306 and 307 which are rotated by a drive means not shown in the drawing.

Sequentially arranged around the periphery of image-bearing member 303 along the arrow a direction are latent image forming device 302, developing device 304, and transfer roller 305. Image-bearing member belt 303 comprises a three layer construction of laminate layers of a dielectric member 333, conductive layer 332, and thin dielectric layer 331, with the dielectric layer 331 side confronting the latent image forming device 302. Latent image forming device 302 is provided with an optical unit 322, and photosensitive member plate 321 is provided between optical unit 322 and image-bearing member belt 303. In the present embodiment, an LED optical system comprising an array of a plurality of LED elements arranged in a direction perpendicular to the rotation direction of image-bearing belt 303 is provided as the optical unit 322.

Figure 14:
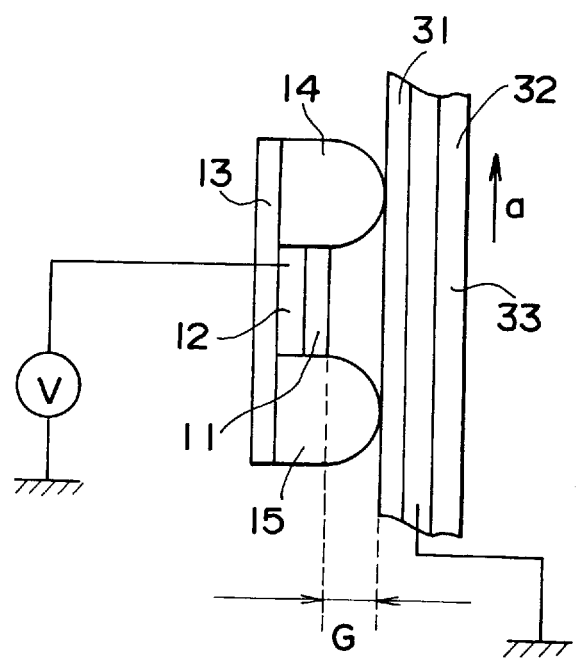
FIG. 14 shows the writing head of FIG. 13.

FIG. 14 is an enlargement of the photosensitive plate 321. As shown in FIG. 14, photosensitive plate 321 comprises a transparent substrate 513 over which is formed a transparent conductive layer 512, with a photosensitive layer 511 formed over said conductive layer. Spacers 514 and 515 formed of TFE resin are provided at bilateral ends of the surface of transparent substrate 513, to as to normally maintain a predetermined distance G between photosensitive layer 511 and the dielectric layer 331 of image-bearing belt 303. In the present embodiment, the self-focusing lens usually required for an LED optical unit is not used because the optical unit 322 is very close to photosensitive plate 321. Spacers 514 and 515 are not limited to TFE resin insofar as such materials have a small friction coefficient relative to image-bearing member belt 103, and are not easily damaged. The conductive layer 332 of image-bearing belt 303 is grounded, and a predetermined voltage is applied between transparent conductive layer 512 of photosensitive plate 321 and conductive layer 332 of image-bearing belt 303, and in this state, reversal image exposure is accomplished by optical unit 322 disposed on the opposite side of the photosensitive layer to the side confronting image-bearing belt 303. The exposed portion of the photosensitive layer becomes conductive, and an electrostatic latent image is formed on the surface of photosensitive layer 511 via a discharge occurring between the surface of image-bearing member 303 and the surface of photosensitive layer 511 in the exposure region. This latent image promptly migrates to the surface of image-bearing belt 303 which confronts photosensitive layer 511, an electrostatic latent image is formed on the dielectric layer 331 of image-bearing belt 303 and said latent image has a polarity corresponding to the voltage applied between the transparent conductive layer 512 of photosensitive plate 321 and the conductive layer 332 of image-bearing belt 303.

Developing device 304 is provided with a developer tank 340 which accommodates a two-component developer 342 comprising a carrier and toner, and the developer is mixed by a mixing member 343 within the tank. The developing device is not limited to a device using a two-component developer, and a developing device using a monocomponent developer comprising toner alone may be used. Reference number 341 in FIG. 13 refers to a developing roller for supplying toner to an electrostatic latent image formed on image-bearing belt 303. A predetermined developing bias is applied between developing roller 341 and conductive layer 332 of image-bearing member 303. The electrostatic latent image formed on image-bearing member 303 is transported to a position opposite developing device 304 by means of the rotation of drive rollers 306 and 307, and is developed as a toner image via contact with developing roller 341. Thereafter, the toner image is transferred to and fixed on transfer sheet 308 by transfer roller 305 at the same time it is heated by heating member 360 provided within drive roller 306. At this time, the toner image on image-bearing belt 303 is completely transferred to transfer sheet 308. Thus, a series of image forming operations of the present invention ends.

Figure 15:
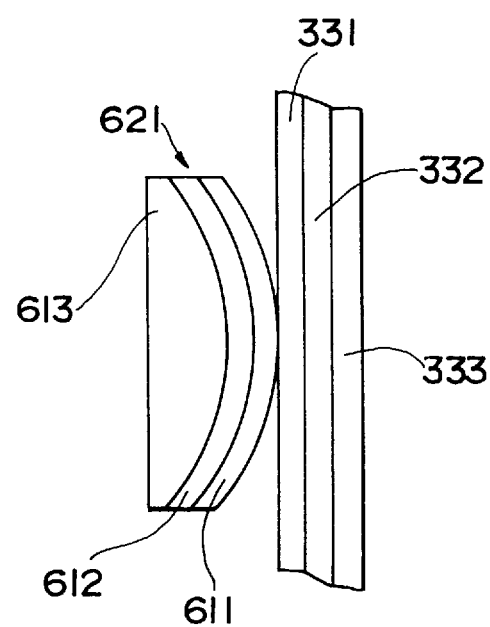
FIG. 15 briefly shows a modification of the writing head.

Pursuant to the embodiments described above, since the photosensitive layer 511 and dielectric layer 331 are maintained in a state of non-contact, the surface of photosensitive layer 511 is not soiled even when foreign matter such as paper debris and the like is transported image-bearing belt 303, thereby allowing even more stable latent image formation. The objects of the present invention are suitably achieved by other image forming methods of the present invention even when photosensitive layer 611 and dielectric layer 331 are in a state of contact as shown in FIG. 15. Photosensitive plate 621 shown n FIG. 15 comprises a transparent substrate 613 over which is formed a transparent conductive layer 612, with a photosensitive layer formed over said conductive layer, such that photosensitive layer 611 may linearly contact dielectric layer 331 by providing transparent substrate 613 with an arc-like curvature opposite dielectric layer 331.

Specific examples of the image forming apparatus of the present invention are described below.

EXAMPLE 15

Figure 16:
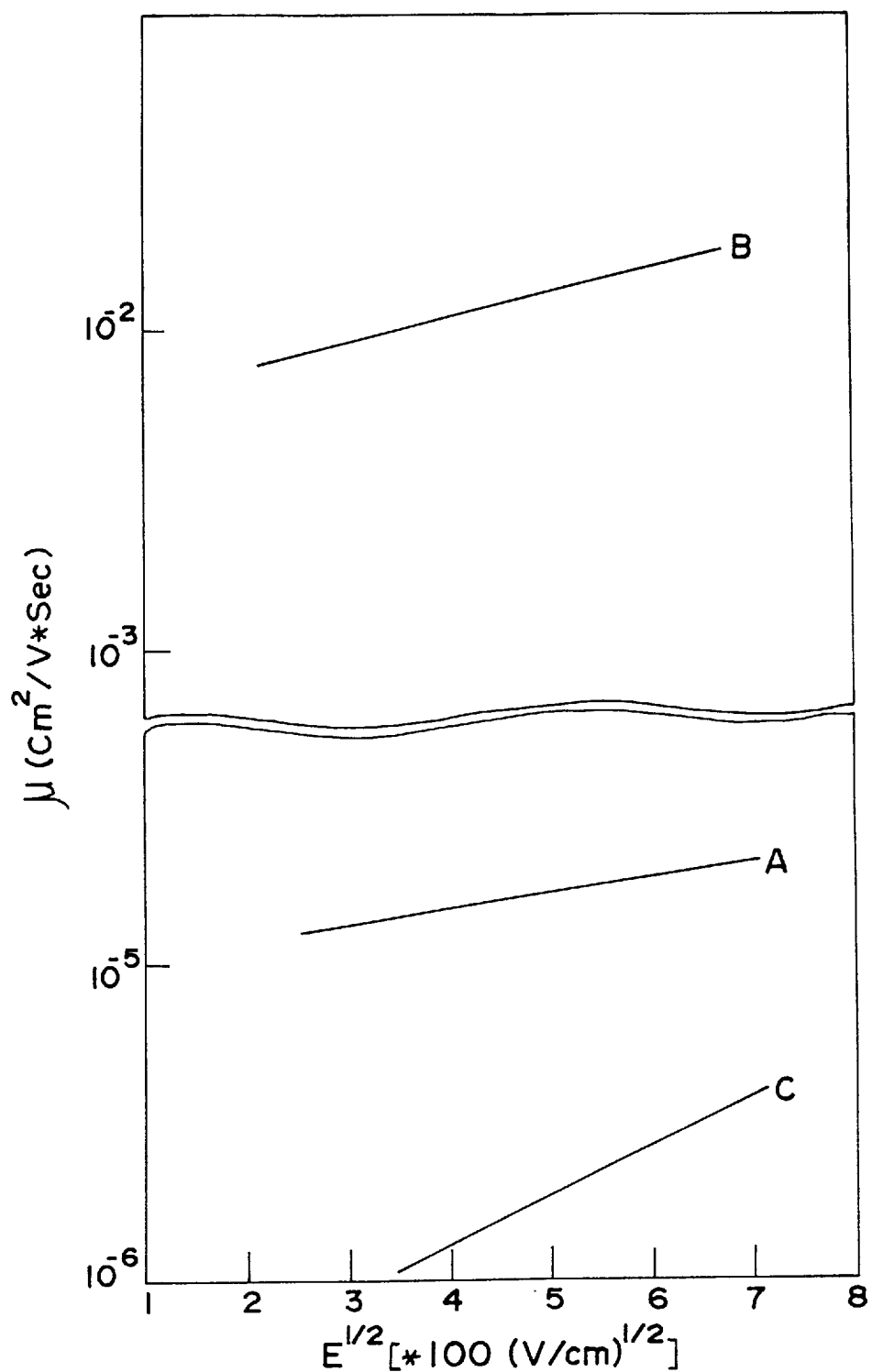
FIG. 16 is a graph showing the values for the moving speed of the photosensitive member included in the image forming apparatus of the third embodiment.

Photosensitive plate 321 comprises an ITO layer glass panel provided with a photosensitive layer 511 of a charge generating layer and a charge transporting layer. The charge-generating layer was formed using a mixture mainly of bisazo pigment and polyvinylbutyral resin about 0.4 $\mu$m in thickness. Then a charge-transporting layer was formed using a mixture hydrazone compound and polycarbonate as the main components and 0.4 $\mu$m in thickness. At this time, the migration speed $\mu$ was about $1.5 \times 10^{-5}$ (cm$^2$/v·sec) determined by the well-known "time of flight" method, as shown in FIG. 16. On the other hand, the image-bearing belt was provided with a 50 $\mu$m conductive layer on polyimide film, and a fluororesin layer 10 $\mu$m thick. The gap G between the photosensitive layer and the dielectric layer was set at 20 $\mu$m. A voltage of +1.5 kV was applied between the photosensitive plate and the conductive layer of the image-bearing belt, and the speed of movement of the image-bearing belt was fixed at 3.5 (cm/sec).

EXAMPLES 16 and 17

These examples were conducted in the same manner as example 15 with the exception that the thickness of the photosensitive layer was 20 $\mu$m and 30 pm, respectively.

EXAMPLES 18 and 19

These examples were conducted in the same manner as example 15 with the exception that the thickness of the photosensitive layer was set at 20 $\mu$m, and the voltage applied between the photosensitive plate and the conductive layer of the image-bearing member was +1 kV and +2 kv, respectively.

EXAMPLE 20

This example was conducted in the same manner as example 15 with the exception that the thickness of the photosensitive layer was set at 20 $\mu$m, and the speed of movement of the image-bearing member was set at 1.0 (cm/sec).

EXAMPLE 21

Photosensitive member plate 321 comprised an amorphous silicon photosensitive material vacuum deposited on an ITO layer glass substrate. A 0.2 $\mu$m P-type amorphous silicon layer was formed as an undercoat layer, a 20 $\mu$m amorphous silicon layer was formed as a photosensitive layer, and thereafter, a 0.2 $\mu$m carbon-rich amorphous silicon layer was formed as an overcoat layer. At this time, the migration speed $\mu$ was set at about $8 \times 10^{-3}$ (cm$^2$/v·sec) as shown in FIG. 16.

The image-bearing belt comprised with a conductive layer on a 50 $\mu$m polyimide film, over which was formed a 10 $\mu$m fluororesin layer. The speed of movement of the image-bearing member was set. at 3.5 (cm/sec). The gap G between the photosensitive plate and the dielectric member was set at 20 $\mu$m, and a voltage of +1.5 kV was applied between the photosensitive plate and dielectric member.

EXAMPLE 22

This example was conducted in the same manner as example 20 with the exception that the moving speed of the image-bearing member was set at 10 (cm/sec).

EXAMPLE 23

Photosensitive plate 321 comprised a photosensitive layer 511 of a charge generating layer and a charge transporting layer formed on an ITO type glass substrate. A mixture of mainly τ-type non-metallic phthalocyanine and polyvinylbutyral resin about 0.4 $\mu$m thick formed the charge generating layer, and a mixture of mainly hydrazone compound and polycarbonate resin about 20 $\mu$m thick formed the charge transporting layer. The migration speed $\mu$ in the photosensitive layer was about $1 \times 10^{-5}$ (cm$^2$/v·sec), as shown in FIG. 16. On the other hand, the image-bearing belt comprised a conductive layer formed on a 50 $\mu$m polyimide film, and over which was formed a 10 $\mu$m fluororesin layer. The moving speed of the image-bearing member was set at 3.5 (cm/sec). At this time, the gap G between the photosensitive plate and the dielectric layer was set at 20 $\mu$m, and a voltage of +1.5 kV was applied between the photosensitive plate and the dielectric layer.

EXAMPLE 24

The example used a photosensitive plate and image-bearing belt having the same characteristics as example 15, and the photosensitive plate shown in FIG. 4 was included in the image forming apparatus of FIG. 3. A voltage of +1.5 kV was applied between the photosensitive plate and the dielectric layer of the dielectric member, and the speed of movement of the image-bearing member was set at 2.5 (cm/sec).

EVALUATIONS

The results of image evaluations under the latent image forming conditions state above are shown in FIG. 18. The exposure conditions were 120 µW/dot at 300 dpi.

Figure 17:
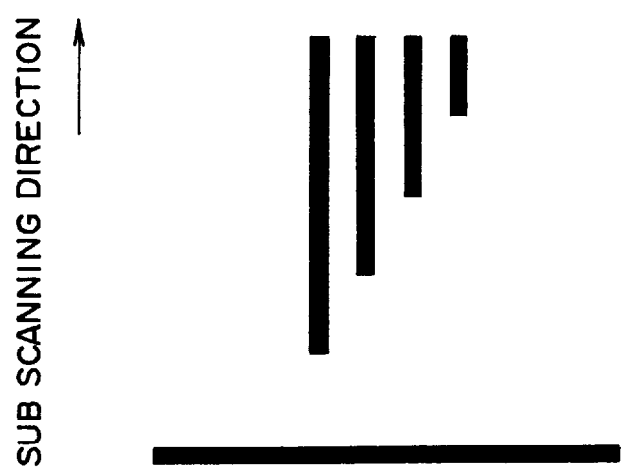
FIG. 17 shows a desirable image used for testing.

The test pattern used in the evaluations comprised 3-dot horizontal and vertical lines, as shown in FIG. 17. Image evaluation was accomplished using four rankings determined by the value of line width fluctuation of the horizontal lines.

⊚: Line width fluctuation less than 290 µm±30 µm
○: line width fluctuation less than 290 µm±50 µm
Δ: line width fluctuation less than 290 µm±100 µm
X: line width fluctuation greater than above; unsuitable for practical use In the table, P is defined as P=t×vs/(µ×e).

The toner used in the present example is a positive charge type toner having an average particle size of 10 µm obtained by kneading, pulverizing, and classifying a mixture of mainly styrene-acrylic resin and carbon black by a well-known method. This toner is accommodated in developing device 4, shown in FIG. 14, and accomplishes development by means of a developing bias. As can be readily understood from FIG. 18, the images obtained by an image forming apparatus wherein the photosensitive layer migration speed, photosensitive layer thickness, image-bearing member moving speed, and field intensity across the photosensitive layer are not maintained in a predetermined interdependent relationship, are subject to severe horizontal line width fluctuation which is disadvantageous for practical application, whereas the image forming apparatus of the present invention which does maintain predetermined interdependent relationships among the aforesaid parameters produces negligible horizontal line width fluctuation, which resulted in the production of excellent images.

In the image forming apparatus of the third embodiment described above, low ozone generation and compact construction are realized, and latent image drift in the direction of movement of the dielectric member is prevented as far as possible and stable images are obtained by quantitatively regulating the relationship of factors of photosensitive member migration speed µ (cm2/v·sec), photosensitive-layer thickness t (cm), image-bearing member moving speed Vs (cm/sec), and field intensity e (v/cm) across the photosensitive layer.

What is claimed is:

1. An image forming apparatus comprising:
   an image-bearing member having an insulation layer disposed over an electrically conductive layer and which is movable;
   a photosensitive member having a photosensitive layer disposed over an electrically conductive layer and arranged so as to confront the insulated layer of the image-bearing member;
   means for applying a voltage between the conductive layer of the photosensitive member and the conductive layer of the image-bearing member;
   means for scanning exposure of an image on the photosensitive member in a direction perpendicular to the direction of movement of the image-bearing member while said voltage is applied;
   means for displacing the exposure position exposed by said exposure means in the direction of movement of the image-bearing member for each scan; and
   means for developing an electrostatic latent image formed on said image-bearing member.

2. An image forming apparatus as claimed in claim 1, wherein said displacing means includes a plurality of lasers, optical unit for scanning laser beams as plural spots in parallel to the scanning dirction and control circuit for turn ON/OFF one of said lasers for each scan based on image data.

3. An image forming apparatus as claimed in claim 1, wherein said displacing means includes two lasers, optical unit for scanning laser beams as two spots in parallel to the scanning dirction and control circuit for alternatingly driving said lasers for each scan based on image data.

4. An image forming apparatus as claimed in claim 1, wherein said displacing means includes one laser, optical unit for scanning laser beams as plural spots in parallel to the scanning dirction and control circuit for driving said laser based on image data.

5. An image forming apparatus as claimed in claim 4, wherein said optical unit includes a polygonal mirror having an even number of reflective surfaces, an angle of each reflective surface being shifted from a perpendicular plane by a predetermined angle such that the beam scans a different desired position for each scan.

6. An image forming apparatus comprising:
   an image-bearing member having an insulation layer disposed over an electrically conductive layer and which is movable;
   a photosensitive member having a photosensitive layer disposed over an electrically conductive layer and arranged so as to confront the insulated layer of the image-bearing member;
   means for applying a voltage between the conductive layer of the photosensitive member and the conductive layer of the image-bearing member;
   means for scanning exposure of an image on the photosensitive member in a direction perpendicular to the direction of movement of the image-bearing member while said voltage is applied;
   means for reciprocating movement of said photosensitive member in the direction of movement of said image-bearing member; and
   means for developing an electrostatic latent image formed on said image-bearing member.

7. An image forming apparatus as claimed in claim 6, wherein a relationship between the average speed vpc of reciprocating movement of photosensitive member and the moving speed of the image-bearing member vs is as follows $$|vs|/20 < |vpc| < 5 \times |vs|$$

and

Vpc=2 W/tp where W is the width (mm) of reciprocating movement of photosensitive member, and tp is the period (sec) of reciprocating movement of photosensitive member.

8. An image forming apparatus as claimed in claim 6, wherein said reciprocating means includes a cam provided at the top of the photosensitive member and a motor rotating said cam to reciprocatedly drive the photosensitive member in the subscan direction.

9. An image forming apparatus comprising an image-bearing member having an insulation layer disposed over an electrically conductive layer and which is movable;
   a photosensitive member having a photosensitive layer disposed over an electrically conductive layer and arranged so as to confront the insulated layer of the image-bearing member;
   means for applying a voltage between the conductive layer of the photosensitive member and the conductive layer of the image-bearing member;

means for optical exposure of an image on the photosensitive layer while said voltage is applied; and means for developing an electrostatic latent image formed on said image-bearing member, and wherein the various values of the photosensitive layer construction of said photosensitive member produce the following relationship:

$$1\times10^{-6} \leq t \times Vs/(\mu \times e) \leq 5\times10^{-3}$$

when the moving speed of the photosensitive layer is set at $\mu(cm^2/v \cdot sec)$, the thickness of the photosensitive layer is set at $t(cm)$, the moving speed of the image-bearing member is set at $Vs(cm/sec)$, and the electric field strength across the photosensitive layer is set at $e(v/cm)$.

* * * * *